United States Patent
Beck et al.

(10) Patent No.: US 7,359,923 B2
(45) Date of Patent: Apr. 15, 2008

(54) ONLINE INCREMENTAL DEFERRED INTEGRITY PROCESSING AND MAINTENANCE OF ROLLED IN AND ROLLED OUT DATA

(75) Inventors: Kevin Leo Beck, Portland, OR (US); Paul Michael Brett, Portland, OR (US); Jeffrey James Goss, Toronto (CA); Dieu Quang La, Markham (CA); Catherine Suzanne McArthur, Uxbridge (CA); William T. O'Connell, Etobicoke (CA)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 10/923,547

(22) Filed: Aug. 20, 2004

(65) Prior Publication Data

US 2006/0041569 A1   Feb. 23, 2006

(51) Int. Cl.
*G06F 12/00* (2006.01)
*G06F 17/30* (2006.01)

(52) U.S. Cl. .................. 707/200; 707/201; 707/204
(58) Field of Classification Search .................. 707/2, 707/3, 7, 100, 101, 102, 200, 201, 204; 711/173, 711/112
See application file for complete search history.

(56) References Cited

U.S. PATENT DOCUMENTS

| | | | |
|---|---|---|---|
| 5,706,494 A | 1/1998 | Cochrane et al. | 395/602 |
| 5,960,194 A | 9/1999 | Choy et al. | 395/613 |
| 6,026,390 A | 2/2000 | Ross et al. | 707/2 |
| 6,038,569 A | 3/2000 | Beavin et al. | 707/203 |
| 6,047,285 A | 4/2000 | Jacobs et al. | 707/4 |
| 6,098,075 A | 8/2000 | Becraft, Jr. et al. | 707/201 |
| 6,125,360 A | 9/2000 | Witkowski et al. | 707/2 |
| 6,134,543 A * | 10/2000 | Witkowski et al. | 707/2 |
| 6,272,502 B1 | 8/2001 | Lieuwen et al. | 707/203 |
| 6,334,128 B1 | 12/2001 | Norcott et al. | 707/5 |
| 6,353,835 B1 | 3/2002 | Lieuwen | 707/203 |
| 6,366,902 B1 * | 4/2002 | Lyle et al. | 707/2 |
| 6,438,562 B1 | 8/2002 | Gupta et al. | 707/201 |
| 6,453,314 B1 * | 9/2002 | Chan et al. | 707/3 |

(Continued)

OTHER PUBLICATIONS

C. Mohan (1993),IMB's Relational DBMS Products: Features an Technologies, pp. 445-448.*

(Continued)

*Primary Examiner*—Don Wong
*Assistant Examiner*—Merilyn P Nguyen
(74) *Attorney, Agent, or Firm*—Sughrue Mion, PLLC

(57) ABSTRACT

A system and a method for the deferral and incremental performance of integrity processing for data rolled into a table of a data warehouse and for the deferral and incremental performance of maintenance on data rolled out of a table of the data warehouse while permitting general users online access to other data contained in the table. The rolled in and rolled out data are contained within specific data partitions of the table. Each data partition in the table has an associated distinguishable partition ID. Each data partition can also have associated attributes corresponding to containing rolled-in and rolled-out data respectively. Table operation mechanisms are arranged such that general users of the table do not access rolled in data in a partition for which integrity processing has not yet been performed and do not access rolled out data.

9 Claims, 3 Drawing Sheets

U.S. PATENT DOCUMENTS

| | | | |
|---|---|---|---|
| 6,453,383 B1* | 9/2002 | Stoddard et al. | 711/112 |
| 6,983,291 B1* | 1/2006 | Cochrane et al. | 707/200 |
| 7,149,736 B2* | 12/2006 | Chkodrov et al. | 707/7 |
| 7,167,878 B2* | 1/2007 | Chan et al. | 707/204 |
| 7,302,441 B2* | 11/2007 | Chan et al. | 707/101 |
| 2003/0055822 A1 | 3/2003 | Yu | 707/6 |
| 2004/0122828 A1* | 6/2004 | Sidle et al. | 707/100 |
| 2004/0193622 A1* | 9/2004 | Peleg et al. | 707/100 |
| 2006/0047622 A1* | 3/2006 | Folkert et al. | 707/1 |

OTHER PUBLICATIONS

C. Mohan (1993), IBM's Relational DBMS Products: Features and Technologies, pp. 445-448.*

Furukawa et al., *Reducing Algorithms for Materialized View Updates*, Conceptual Modeling—ER '98. Proceedings 17$^{th}$ Intl. Conf on Conceptual Modeling Singapore, Nov. 16019, 1998 378-392.

Ross et al., *Materialized View Maintenance and Integrity Constraint Checking: Trading space for Time*, SIGMOD '96, Jun. 1996, Montreal Canada, pp. 447-458.

Leuschel, et al., *Towards Creating Specialized Integrity Checks Through Partial Evaluation of Meta-Interpreters1995 ACM 0-89791-720-095/0006*, pp. 253-263.

Sistla et al., *Temporal Conditions and Integrity Constraints in Active Database Systems*, SIGMOD '95, San Jose, CA USA, pp. 269-280.

Kawaguchi et al., *Concurrency Control Theory for Deferred Materialized Views*, http://citeseer.nj.nec.com/kawaguchi97concurrency.html, ICDT, 1997, pp. 306-320.

* cited by examiner

ONLINE INCREMENTAL DEFERRED INTEGRITY PROCESSING AND MAINTENANCE OF ROLLED IN AND ROLLED OUT DATA

FIELD OF INVENTION

The present invention relates to the field of database management systems, and in particular, to a method, system and computer program product for deferred integrity checking and maintenance of a data warehouse.

BACKGROUND

In a typical data warehouse environment large amounts of data are periodically rolled into and rolled out of tables. In the case of new data being rolled into a table, before the new data can be accessible to a general user of the table, integrity processing (e.g. constraint checking, index maintenance, and materialized view maintenance) must be preformed on the new data. It is desirable that existing data in the table remain fully on-line and available to the general user while integrity processing is performed on the rolled in data. Existing methods typically either bring the entire table off-line or bring the table on-line in a read-only mode while the integrity processing of the rolled in data is carried out.

Similarly, in the case of dated data being rolled out of the table, if the table is involved in any materialized views or referential integrity relationships, the materialized views and referential integrity relationships must be maintained with respect to the rolled out data. Also, if there are any indices defined on the table, these indices must be maintained with respect to the rolled out data. It is desirable for the roll-out operation to complete quickly. Existing methods typically couple the maintenance of materialized views, referential integrity and indices with the roll-out operation. As a result, the roll-out operation can not be completed until all of the maintenance is performed. As typically a large amount of data is rolled out, the maintenance of materialized views, referential integrity and indices with respect to the rolled out data can require a significant amount of time hence delaying the completion of the roll-out operation. In some cases full re-computation of the materialized views, full scans of dependent tables in referential integrity relationships or full rebuilding of indices are required.

What is needed is a mechanism to permit full on-line access to a table while integrity processing of rolled in data is carried out and to minimize the delay in completing a roll-out operation caused by the need for maintenance of the materialized views, referential integrity and indices involving the table.

SUMMARY

The present invention provides for the deferral and incremental performance of integrity processing for data rolled into a table of a data warehouse and for the deferral and incremental performance of maintenance on materialized views, referential integrity and indices for data rolled out of a table of a data warehouse. In the case of rolled-in data, the present invention permits the table to be fully on-line and accessible during integrity processing. In the case of roll-out data the present invention permits the roll-out operation to complete with minimal delay and the remaining data to be made online accessible immediately after the roll-out operation completes. According to the present invention the rolled-in and rolled-out data are contained within specific data partitions of the table. Each data partition in the table has an associated distinguishable partition ID. Each data partition can also have associated attributes including, for example, the attributes of 'attached' and 'detached' corresponding to containing rolled-in and rolled-out data respectively. Table operation mechanisms are arranged such that general users of the table do not access rolled-in data in a partition for which integrity processing has not yet been performed and that general users of the table do not access rolled-out data in a partition that is still physically part of the table while still having access to other (i.e. non rolled-out) data in the table. Thereby, after data is rolled-in to or rolled-out of the data warehouse, the data warehouse can be made available to the general user while integrity processing and maintenance are deferred and can be incrementally performed.

In accordance with one aspect of the present invention there is provided a data warehouse management system to be operatively coupled to a data processing system having memory for storing a data warehouse, the data warehouse management system providing for general user availability when integrity processing of rolled-in data and maintenance of rolled-out data are deferred and performed incrementally including a data warehouse administration module for administration of the data warehouse having a table dividable into partitions for containing rows of rolled-in and rolled-out data, a distinguishable partition identifier associated with each partition, and a metadata element having an entry corresponding to each partition identifier with attributes signifying whether the associated partition contains rolled-in data and rolled-out data, and an operations management module having operation mechanisms for performing operations on the data warehouse responsive to the attributes.

In accordance with another aspect of the present invention there is provided, for a data warehouse management system to be operatively coupled to a data processing system having memory for storing a data warehouse, a method of managing the data warehouse having a table dividable into partitions for containing rows of rolled-in data and rolled-out data, a metadata element and a data warehouse management system having operation mechanisms, the method allowing for execution of integrity checking of rolled-in data and maintenance of rolled-out data to be deferred and incrementally processed while allowing a general user access to other content of the data warehouse, the method comprising the steps of arranging roll-in and rolled-out data into partitions, assigning a distinguishable identifier corresponding to each partition, creating a metadata entry, in the metadata element, associated with each identifier having attributes asserted to signify if rolled-in data and rolled-out data are contained in a corresponding partition respectively, providing for data warehouse management system operations responsive to the attributes, and de-asserting the attribute signifying rolled-in data is contained in the corresponding partition after integrity processing is completed for the partition.

In accordance with still another aspect of the present invention there is provided a computer program product for managing a data warehouse to be stored in memory of a data processing system, the data warehouse having a table dividable into partitions for containing rows of rolled-in data and rolled-out data, a metadata element and a data warehouse management system having operation mechanisms, the computer program product allowing for execution of integrity checking of rolled-in data and maintenance of rolled-out data to be deferred and incrementally processed while allowing a general user access to other content of the data warehouse, the computer program product including computer readable medium for tangibly embodying and transporting computer executable code directing the data processing system to perform the tasks of arranging roll-in and rolled-out data into partitions, assigning a distinguishable identifier corresponding to each partition, creating a metadata entry, in the metadata element, associated with each identifier having attributes asserted to signify if rolled-in data and rolled-out data are contained in a corresponding partition respectively, providing for data warehouse management system operations responsive to the attributes, and de-asserting the attribute signifying rolled-in data is contained in the corresponding partition after integrity processing is completed for the partition.

Other aspects and features of the present invention will become apparent to those ordinarily skilled in the art to which it pertains upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 1:
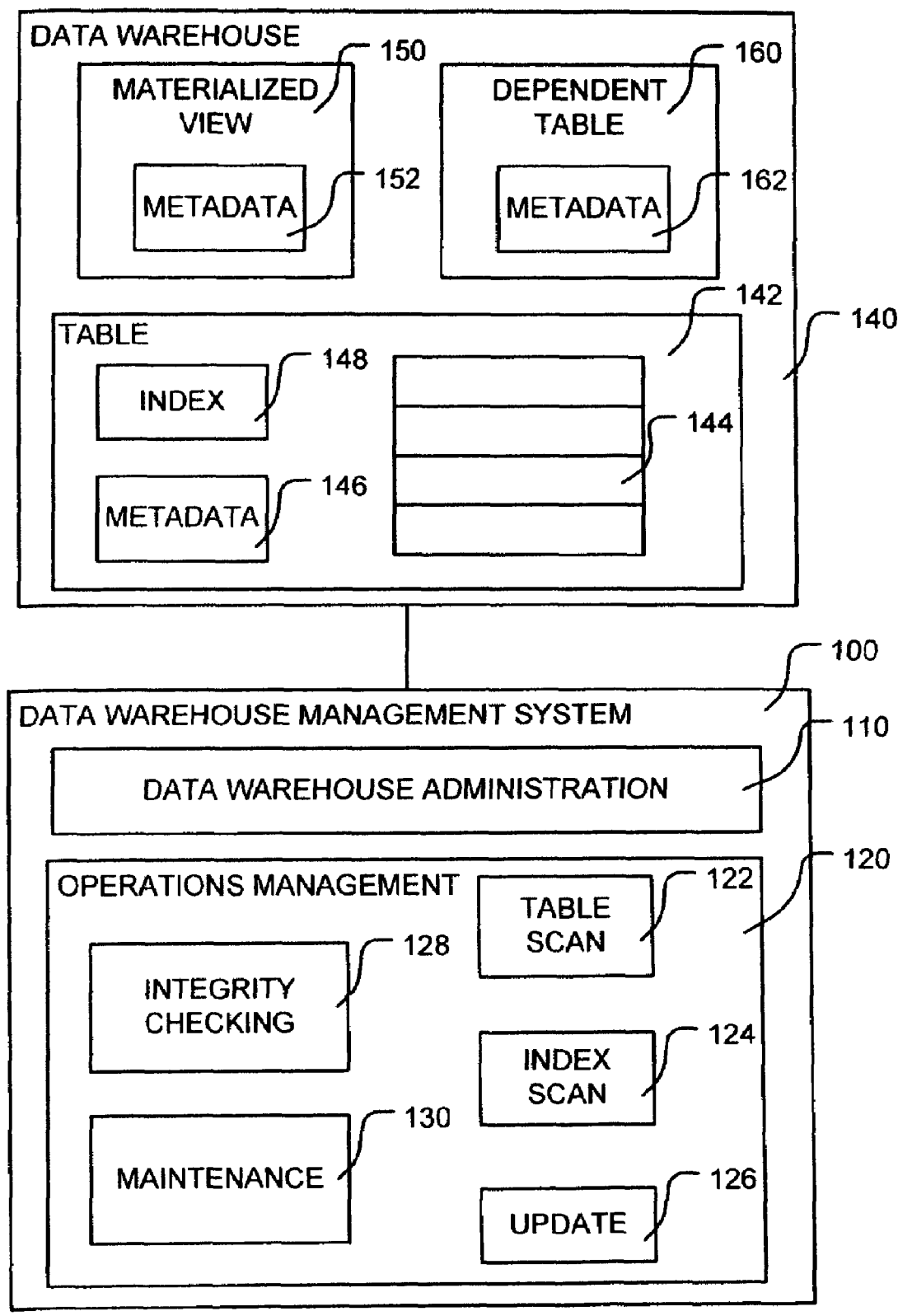
FIG. 1 is a schematic representation of an exemplary embodiment of a data warehouse management system according to the present invention and a data warehouse.

FIG. 1 is a schematic representation of an exemplary embodiment of a data warehouse management system 100 according to the present invention and a data warehouse 140. The data warehouse management system 100 comprises a data warehouse administration module 110 and an operations management module 120. The data warehouse management system 100 is arranged for operative coupling to a data processing system, such as for example the generic computing platform represented in FIG. 3 and described below, having memory for storing the data warehouse 140. The data warehouse management system 100 interacts with the data warehouse 140 in order to administer and operate on the contents of the data warehouse 140. The data warehouse administration module 110 provides administrative functions such as, for example, management of a data model and schema for data warehouse 140. The data warehouse administration module 110 provides for the data warehouse 140 to contain one or more tables 142 each having a plurality of rows of data. Each table 142 can have data partitions (herein after partitions) 144 each containing one or more rows of the table 142. Each partition 144 has an associated partition identifier (herein after PID). Each PID is arranged so as to be distinguishable one from the others. Each table 142 also comprises metadata 146 and can have one or more index mechanisms 148. An index mechanism 148 provides for the association of an index key with one or more rows of the table 142. The operations management module 120 comprises mechanisms that provide for a range of data warehouse operations. Theses operations mechanisms can include: table scan 122, index scan 124, data update 126 (e.g. modify, insert and delete), integrity processing 128 and maintenance 130.

The data warehouse 140 has one or more tables 142, one or more materialized views 150 and one or more dependant tables 160. A dependent table 160 in one that has a referential dependency on another table, such as table 142. A table 142 has one or more partitions 144. A partition 144 contains one or more contiguous (or otherwise ordered) rows in the table 142. Each partition 144 has an associated distinguishable identifier (PID). The metadata 146 has an entry associated with each PID. The metadata 146 entry associated with a PID can have attributes such as, for example, the attributes 'attached' and 'detached'. Each attribute can take on a state selected from a group of states including, for example, the states 'asserted' and 'de-asserted'. Each attribute can be associated with the contents of the partition 144 to which the PID corresponds. For example the attribute 'attached' can be in the state of 'asserted' when the partition 144 contains rolled-in data that has not yet been integrity processed. The attribute 'detached' can be in the state of 'asserted' when the partition 144 contains rolled-out data. Herein after the expression—the attached-attribute is asserted—will be read to have the same meaning as—the attribute 'attached' is in the state of 'asserted'—and the expression—the attached-attribute is de-asserted—will be read to have the same meaning as—the attribute 'attached' is in the state of 'de-asserted'. Similarly, herein after the expression—the detached-attribute is asserted—will be read to have the same meaning as—the attribute 'detached' is in the state of 'asserted'. Each materialized view 150 can contain metadata 152 and each dependent table 160 can contain metadata 152 that are distinct from the table metadata 146.

In the case when data is rolled into the table 142, the rolled-in data is placed in a partition 144 which is said to be attached to the table 142. The attached-attribute for the corresponding PID entry in the metadata 146 is asserted to signify that integrity processing of the rolled-in data in the partition 144 has not yet been performed.

In the case when data is rolled out of the table 142, the rolled-out data is associated with a partition 144 which is said to be detached from the table 142. The detached-attribute for the corresponding PID entry in the metadata 146 is asserted to signify that the partition 144 contains rolled-out data.

In the exemplary embodiment of the present invention the table 142 scan mechanism is arranged to treat as invisible any rows in a partition 144 for which the corresponding PID entry in the metadata 146 has either the attached-attribute asserted or the detached-attribute asserted. The index scan mechanism is arranged to treat as invisible any index that refers to a row in a partition 144 for which the corresponding PID entry in the metadata 146 has either the attached-attribute asserted or the detached-attribute asserted. Such a behavior of the index scan mechanism can be accomplished, for example, by adding, to a row identifier (row ID) associated with each key in an index table, a PID for a partition 144 containing the row corresponding to the row ID. The PID can be used to access the corresponding metadata entry including the attached-attribute and the detached-attribute.

The update mechanism provides for operations on data in the table 142 including: modify, insert and delete. In the case of modify and delete operations, the update mechanism treats as invisible any rows in a partition 144 for which the corresponding PID entry in the metadata 146 has either the attached-attribute asserted or the detached-attribute asserted and therefore does not permit the operation to occur. In the case of insert operations, the update mechanism treats as invisible all partitions 144 for which the corresponding PID entry in the metadata 146 has either the attached-attribute asserted or the detached-attribute asserted.

Therefore, an inserted row of data does not fall within any partition 144 for which the corresponding PID entry in the metadata 146 has either the attached-attribute asserted or the detached-attribute asserted.

The above described behaviors for the table scan mechanism 122, index scan mechanism 124 and update mechanism 126 provide for the beneficial application of the present invention in two cases. In the first, when data has been rolled-in to the table 142 but has not yet been integrity checked, the above described behaviors permit the data warehouse 140 to be normally available to a general user for operations on the content of the data warehouse 140 that pre-existed the data roll-in without concern that the as yet not integrity checked, rolled-in data will negatively affect the general user's interaction with the data warehouse 140. This allows execution of integrity checking of the rolled-in data to be deferred to a later time and incrementally processed without negatively impacting or delaying general user access to pre-existing content of the data warehouse 140. In the second case, when data has been rolled-out of the table 142 but remains physically part of the table, the above described behaviors permit the data warehouse 140 to be normally available to a general user for operations on the content of the data warehouse 140 that was not rolled-out without concern that the rolled-out data will negatively affect the general user's interaction with the data warehouse 140. The physical retention of the rolled-out data in the table and the above described behaviors allow execution of maintenance of the rolled-out data to be deferred to a later time and incrementally processed without negatively impacting or unduly delaying general user access to not rolled-out (i.e. remaining) content of the data warehouse 140

Operation of the integrity processing mechanism 128 and of the maintenance mechanism 130 will now also be described with reference to the two cases: rolled-in data and rolled-out data.

The integrity processing mechanism 128 can be invoked at some time after data is rolled-in to the table 142 for the purposes of applying integrity processing. Since the table 142 is generally assumed to be integrity consistent before data is rolled-in, the application of integrity processing can be limited to those partitions 144 that contain rolled-in data. Partitions 144 that contain rolled-in data are designated by the corresponding PID entry in the metadata 146 having the attached-attribute asserted. The integrity processing mechanism 128 uses the metadata 146 to identify those partitions 144 that contain rolled-in data and thereby determine which data requires integrity processing. Also, the PID corresponding to partitions 144 requiring integrity processing are copied to materialized view metadata 152 and dependent table metadata 162 for use when the materialized views and referential relationships are refreshed respectively.

The maintenance mechanism 130 can be invoked at some time after data is rolled-out of the table 142 for the purposes of doing maintenance. Since the materialized views are generally assumed to be incorrect until the maintenance of materialized views has been performed, materialized views are taken off-line immediately on rolling-out of data and remain off-line until maintenance of the materialized views is performed. Partitions 144 that contain rolled-out data are designated by the corresponding PID entry in the metadata 146 having the detached-attribute asserted. The maintenance mechanism 130 uses the metadata 146 to identify those partitions 144 that contain rolled-out data and thereby determine which data requires maintenance. When data is rolled-out, the PID corresponding to partitions 144 containing rolled-out data are copied to materialized view metadata 152 and metadata of referential dependent tables 162. The PID contained in the materialized view metadata 152 is used to locate the partitions 144 containing rolled-out data during materialized view maintenance (i.e. refresh). Similarly, the PID contained in the metadata of referential dependent tables 162 is used to locate the partitions 144 containing rolled-out data during referential relationships refresh.

Figure 2:
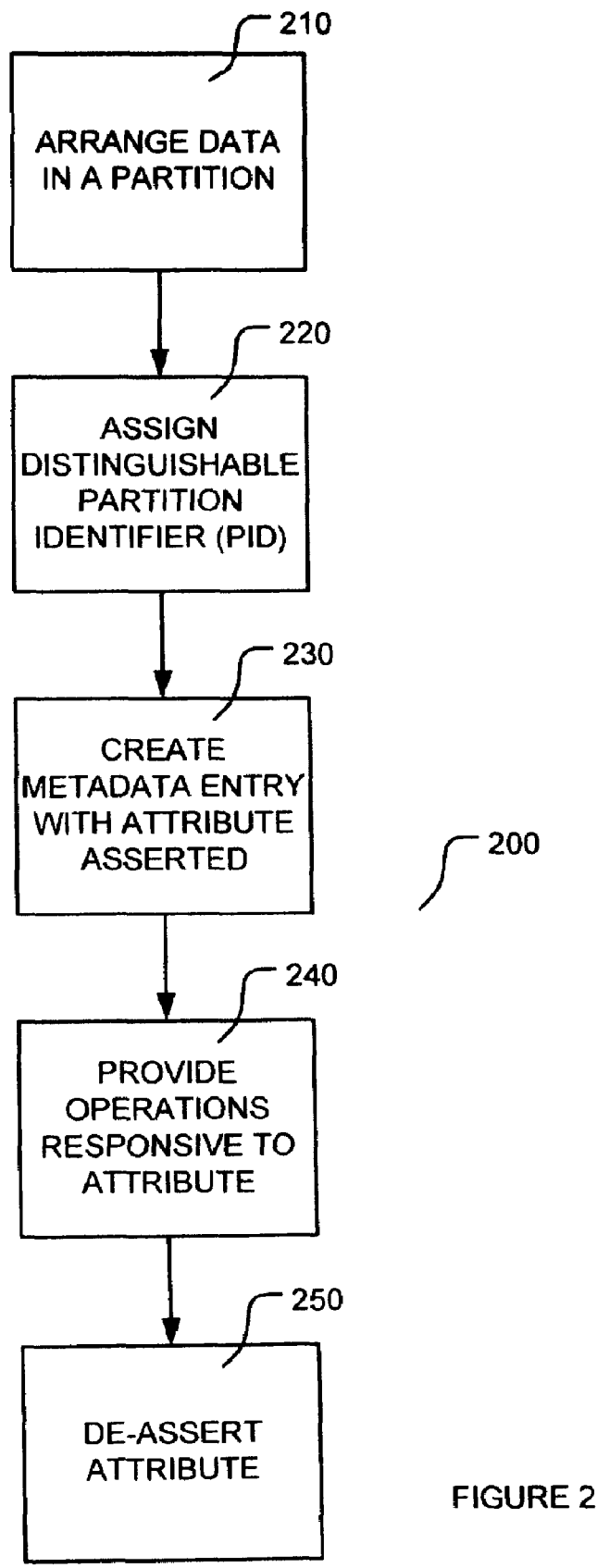
FIG. 2 is a flowchart representing the steps in an exemplary embodiment of a method according to the present invention.

FIG. 2 is a flowchart representing the steps in an exemplary embodiment of a method 200 according to the present invention. Data being rolled-in to or rolled-out of a table 142 in a data warehouse 140 is arranged into a partition 144 in step 210. In step 220, a distinguishable PID is assigned to the partition 144. In step 230 a metadata 146 entry is created corresponding to the PID and having the attached-attribute asserted in the case of roll-in data or the detached-attribute asserted in the case of rolled-out data. In step 240 operations are provided that are responsive to the attached-attribute and detached-attribute in accordance with the function of mechanisms 122, 124, 126, 128, 130 as described above with reference to the operations management module 120 of FIG. 1. Thereby, the data warehouse 140 can be made available to general users while integrity processing is deferred in the case of roll-in data and maintenance is deferred in the case of rolled-out data. The attached-attribute is de-asserted after integrity processing is completed in the case of roll-in data in step 250. Note that the detached-attribute is not de-asserted after maintenance is completed as the detached partitions 144 remain physically part of the table.

The method according to the present invention can be implemented by a computer program product comprising computer readable program codes devices.

Figure 3:
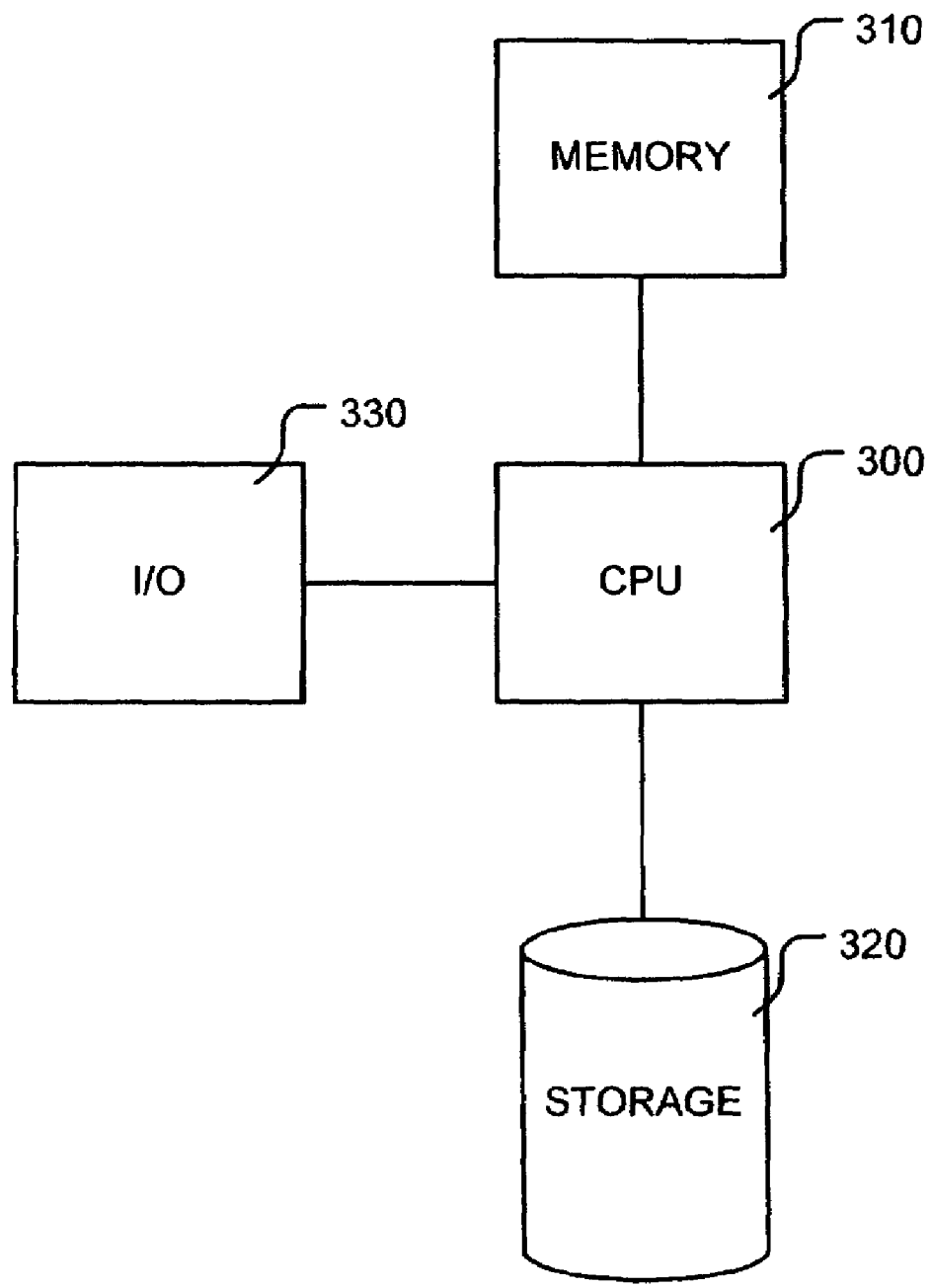
FIG. 3 is a schematic representation of an exemplary generic computing platform on which the present invention can be practiced.

FIG. 3 is a schematic representation of an exemplary generic computing platform on which the present invention can be practiced. A central processing unit (CPU) 300 provides main processing functionality. A memory 310 is coupled to CPU 300 for providing operational storage of programs and data. Memory 310 can comprise, for example, random access memory (RAM) or read only memory (ROM). Non-volatile storage of, for example, data files and programs is provided by a storage device 320 that can comprise, for example, disk storage. Both memory 310 and storage device 320 comprise computer useable media that can store computer program products in the form of computer readable program code. User input and output is provided by an input/output (I/O) facility 330. The I/O facility 330 can include, for example, a graphical display, a mouse and a keyboard.

It will be apparent to one skilled in the art that numerous modifications and departures from the specific embodiments described herein may be made without departing from the spirit and scope of the present invention.

The invention claimed is:

1. A method for managing a data warehouse having a table dividable into partitions for containing rows of at least one of rolled-in data and rolled-out data, a metadata element where a data warehouse management system, having operation mechanisms, is operatively coupled to a data processing system having memory for storing the data warehouse, the method allowing for execution of integrity checking of rolled-in data and maintenance of rolled-out data to be deferred and incrementally processed while allowing a general user access to other content of the data warehouse, the method comprising:

arranging rolled-in and rolled-out data into partitions;

assigning a distinguishable identifier corresponding to each partition;

creating a metadata entry, in the metadata element, associated with each identifier, having attributes asserted to signify if rolled-in data and rolled-out data are contained in a corresponding partition respectively;

providing for data warehouse management system operations responsive to the attributes, wherein deferred integrity processing is performed on a partition in response to the attribute signifying that the associated partition contains rolled-in data; and de-asserting the attribute signifying rolled-in data is contained in the corresponding partition after integrity processing is completed for the partition.

2. The method of claim 1, wherein the operations comprise table scans; index scans; updates; an integrity processing; and maintenance.

3. The method of claim 2, wherein the table scan operations treat as invisible rows in a partition for which the corresponding entry in the metadata has an attribute signifying that rolled-in or rolled-out data is contained therein.

4. The method of claim 2, wherein the data warehouse further comprises an index mechanism having indices that reference rows and wherein the index scan operations treat as invisible any index that refers to a row in a partition for which the corresponding entry in the metadata has an attribute signifying that rolled-in or rolled-out data is contained therein.

5. The method of claim 2, wherein the update operations comprise modify, insert and delete operations on data in the table, modify and delete operations treat as invisible any rows in a partition for which the corresponding entry in the metadata has an attribute signifying that rolled-in or rolled-out data is contained therein and therefore the operation is not permitted to occur, and insert operations treat as invisible all partitions for which the corresponding entry in the metadata has an attribute signifying that rolled-in or rolled-out data is contained therein.

6. The method of claim 2, wherein the integrity processing operations use the metadata to identify those partitions that contain rolled-in data and thereby determine which data requires integrity processing.

7. The method of claim 2, wherein the maintenance operations use the metadata to identify those partitions that contain rolled-out data and thereby determine which data requires maintenance.

8. The method of claim 1, wherein deferred maintenance is performed on a partition in response to the attribute signifying that the associated partition contains rolled-out data.

9. The method of claim 1, wherein incremental integrity processing is performed on a partition in response to the attribute signifying that the associated partition contains rolled-in data, and incremental maintenance is performed on a partition in response to the attribute signifying that the associated partition contains rolled-out data.

* * * * *